(12) United States Patent
Horibe et al.

(10) Patent No.: US 7,063,653 B2
(45) Date of Patent: Jun. 20, 2006

(54) HORIZONTAL MACHINING CENTER

(75) Inventors: Kazuya Horibe, Aichi (JP); Tatehito Buma, Aichi (JP)

(73) Assignee: Yamazaki Mazak Corporation, Aich (JP)

( * ) Notice: Subject to any disclaimer, the term of this patent is extended or adjusted under 35 U.S.C. 154(b) by 70 days.

(21) Appl. No.: 10/965,545

(22) Filed: Oct. 14, 2004

(65) Prior Publication Data
US 2005/0085358 A1    Apr. 21, 2005

(30) Foreign Application Priority Data
Oct. 21, 2003   (JP)   ............................. 2003-360982

(51) Int. Cl.
*B23Q 3/157* (2006.01)
(52) U.S. Cl. .............................. 483/3; 483/68; 409/134
(58) Field of Classification Search ..................... 483/3, 483/30–32, 36, 38–41, 66–68; 409/134
See application file for complete search history.

(56) References Cited

U.S. PATENT DOCUMENTS

| | | | |
|---|---|---|---|
| 4,752,885 A * | 6/1988 | Kawakami et al. | .......... 700/179 |
| 5,624,363 A * | 4/1997 | Kuriki | ............................ 483/3 |
| 5,649,887 A | 7/1997 | Taki et al. | |
| 6,071,220 A | 6/2000 | Sugihara et al. | |
| 2005/0031425 A1* | 2/2005 | Hiramoto et al. | ........... 409/134 |

FOREIGN PATENT DOCUMENTS

| | | |
|---|---|---|
| EP | 1 291 124 A1 | 3/2003 |
| JP | 58-165950 A * | 10/1983 |
| JP | 07-251348 | 3/1995 |
| JP | 10-138085 A * | 5/1998 |
| JP | 11-048083 A * | 2/1999 |
| JP | 11-099427 | 4/1999 |
| JP | 11-333655 A * | 12/1999 |
| JP | 2002-137136 A * | 5/2002 |

OTHER PUBLICATIONS

European Search Report for corresponding Application No. 04024397.4 dated Feb. 3, 2005.

* cited by examiner

*Primary Examiner*—Erica Cadugan
(74) *Attorney, Agent, or Firm*—Renner, Otto, Boisselle and Sklar, LLP

(57) ABSTRACT

A horizontal machining center 1 has a table 20 on a bed 10. An X-axis slidable surface is provided on the bed 10, and a column 30 is driven by a servo motor 32. A spindle stock 40 is supported on the column 30 and is driven along a Y axis extending in a vertical direction. An automatic tool change unit 100 replaces a tool on a spindle 44 on the spindle stock 40 with a tool in a tool magazine. An X-axis cover 200 provided between the table 20 and the column 30 has a plate-like fixed cover 205 and a pair of slidable covers 210. The fixed cover 205 is disposed with one edge thereof passing through an opening 150 formed in the middle of the tool magazine 110. Structured in this way, the horizontal machining center can have a reduced size.

2 Claims, 5 Drawing Sheets

HORIZONTAL MACHINING CENTER

The present application is based on and claims priority of Japanese patent application No. 2003-360982 filed on Oct. 21, 2003, the entire contents of which are hereby incorporated by reference.

BACKGROUND OF THE INVENTION

1. Field of the Invention

The present invention relates to a horizontal machining center. In particular, the present invention relates to improvements of a cover structure for a slidable section and the placement of a tool magazine of a horizontal machining center.

2. Description of the Related Art

Multitasking machine, such as a horizontal machining center, has a cover for preventing intrusion of chips and cutting fluid into a gap between sliding surfaces during cutting of a workpiece. In addition, the machining center has an automatic tool change unit near the spindle and, thus, has to have a space for accommodating a tool magazine or the like, which leads to a large footprint of the whole machining center.

A slidable cover for machine tools, such as a lathe, is disclosed in patent reference 1.

Patent document 1: Japanese Patent Laid-Open No. 7-251348.

SUMMARY OF THE INVENTION

The present invention provides a horizontal machining center that is reduced in width and enhanced in maintainability through improvements in structure of a cover for an X-axis slidable surface and in placement of a tool magazine and the cover.

A horizontal machining center according to the present invention essentially comprises: a bed; a table mounted on the bed on which a workpiece is mounted; a column that moves along a guide rail provided on the bed along a horizontal axis; a spindle stock that moves along a guide rail provided on the column along a vertical axis; a spindle attached to the spindle stock in a horizontal position; an automatic tool change unit disposed close to the spindle; and a tool magazine for housing an interchangeable tool, in which a cover disposed between the table and the column comprises a plate-like fixed cover fixed in a vertical plane and a pair of slidable covers supported slidably with respect to the fixed cover, and the cover is disposed with one edge thereof passing through an opening formed in the middle of the tool magazine.

The slidable covers are mounted or removed at edges of the fixed cover.

According to the present invention, the cover provided in a vertical plane can be disposed with one edge thereof passing through the opening formed in the middle of the tool magazine. Therefore, the whole machine can have a reduced size, and the floor space therefore can be reduced.

DETAILED DESCRIPTION OF THE PREFERRED EMBODIMENT

Figure 1:
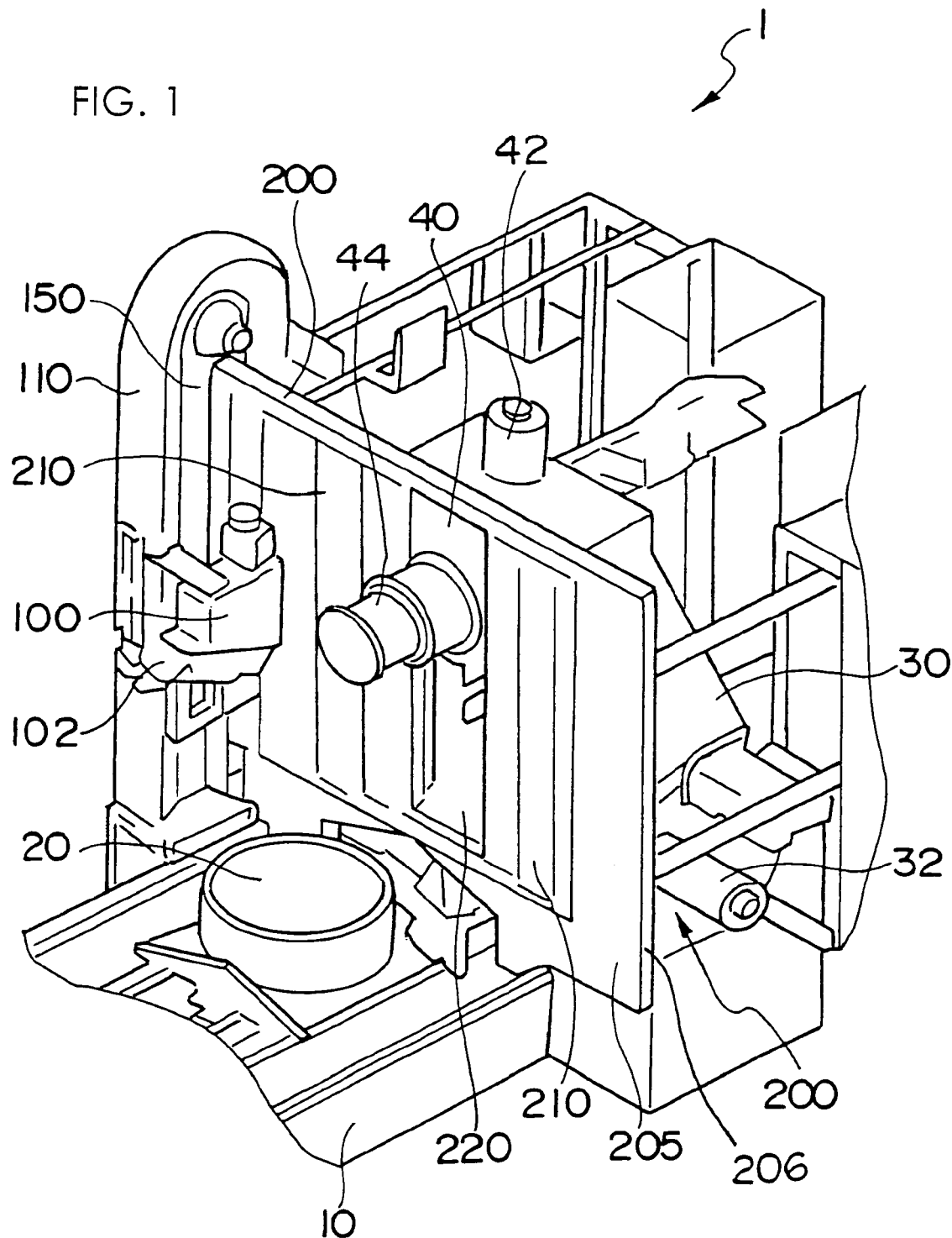
FIG. 1 is a perspective view of a horizontal machining center according to the present invention.

FIG. 1 is a schematic perspective view of a horizontal machining center according to an embodiment of the present invention.

A horizontal machining center generally denoted by reference numeral 1 has a table 20 on a bed 10, and a workpiece is mounted on the table 20.

The bed 10 has an X-axis slidable surface (not shown), and a column 30 is mounted on the bed 10 slidably along an X axis. The column 30 is driven by a servo motor 32.

On the column 30, a spindle stock 40 is supported slidably along a Y axis. The spindle stock 40 is driven along the Y axis by a servo motor 42. A spindle 44 supported by the spindle stock 40 grasps a cutting tool and relatively moves with respect to the table 20 along a Z axis.

A tool magazine 110 is placed near the bed 10 and the table 20. An automatic tool change unit 100 is mounted between the tool magazine 110 and the spindle 44. The automatic tool change unit 44 is to remove a tool after use from the spindle 44 and inserts a new tool to the spindle 44.

A cover 200 for the x-axis slidable surface is mounted between the column 30 and the table 20.

The cover 200 has a plate-like fixed cover 205, which is fixed to the bed 10 at the lower edge thereof.

The fixed cover 205 is disposed in such a manner that an edge thereof on the side of the tool magazine 110 passes through an opening 150 formed in the middle of the tool magazine 110.

The cover 200 has a pair of right and left slidable covers 210 that are slidably attached to the fixed cover 205. The inner edges of the paired right and left slidable covers 210 are attached to the spindle stock 40, and the slidable covers 210 slide following the movements of the spindle stock 40 along the X axis.

The spindle stock 40 moves vertically in an opening 220 between the paired right and left slidable covers 210. The opening 220 is covered with a Y-axis cover.

Figure 2:
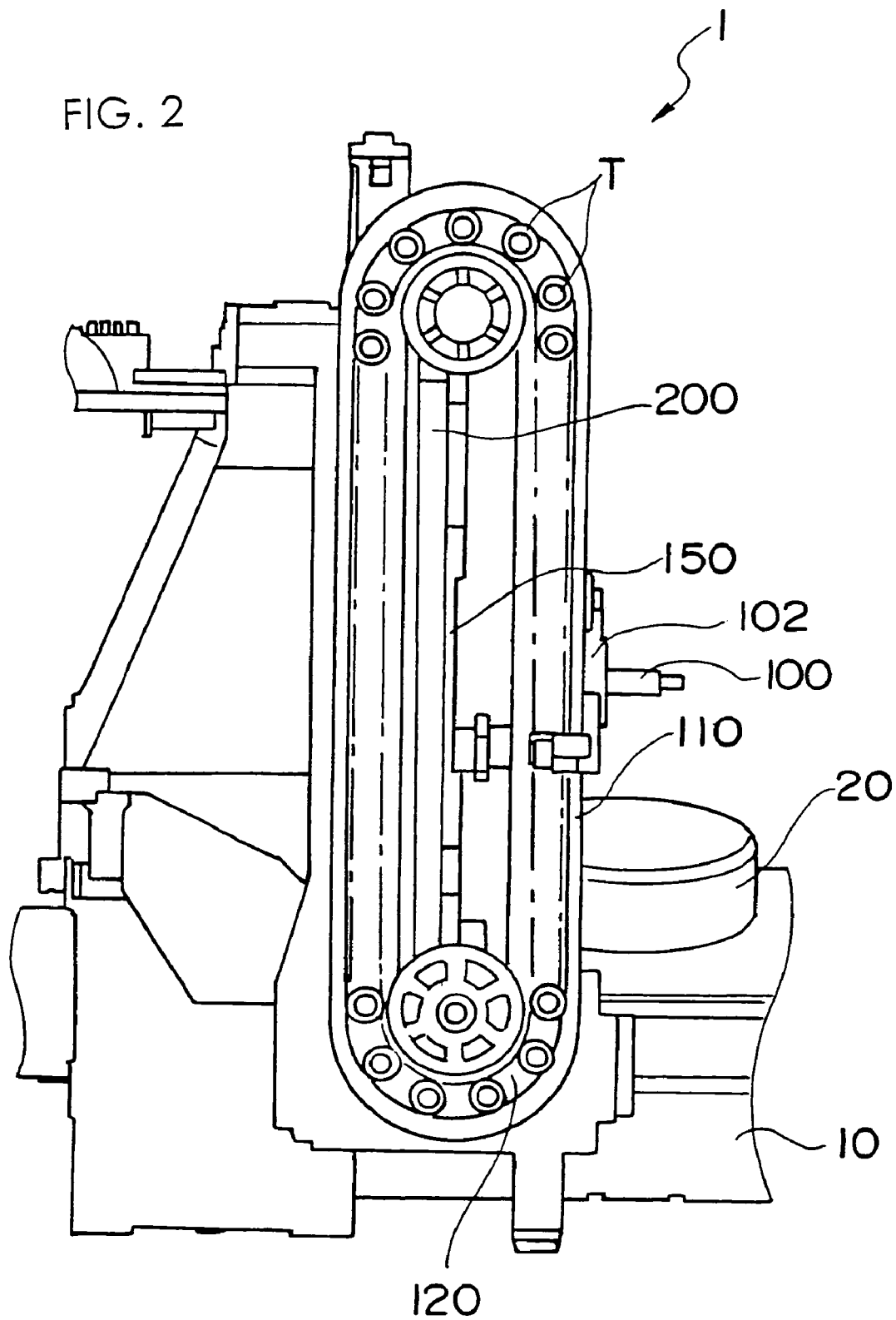
FIG. 2 is a left side view of the horizontal machining center according to the present invention.

FIG. 2 is a left side view of the horizontal machining center 1 according to the present invention, which is viewed from the side of the tool magazine.

The tool magazine 110 incorporates a chain 120 for supporting a tool T. In tool change, a required tool T is positioned at a changing position, and a tool T after use on the spindle 44 is automatically replaced with the required tool T.

The tool magazine 110 has the opening 150 in the middle thereof. The X-axis slidable surface cover 200 is disposed in such a manner that an edge thereof on the side of the tool magazine 110 passes through the opening 150 in the tool magazine.

Figure 3:
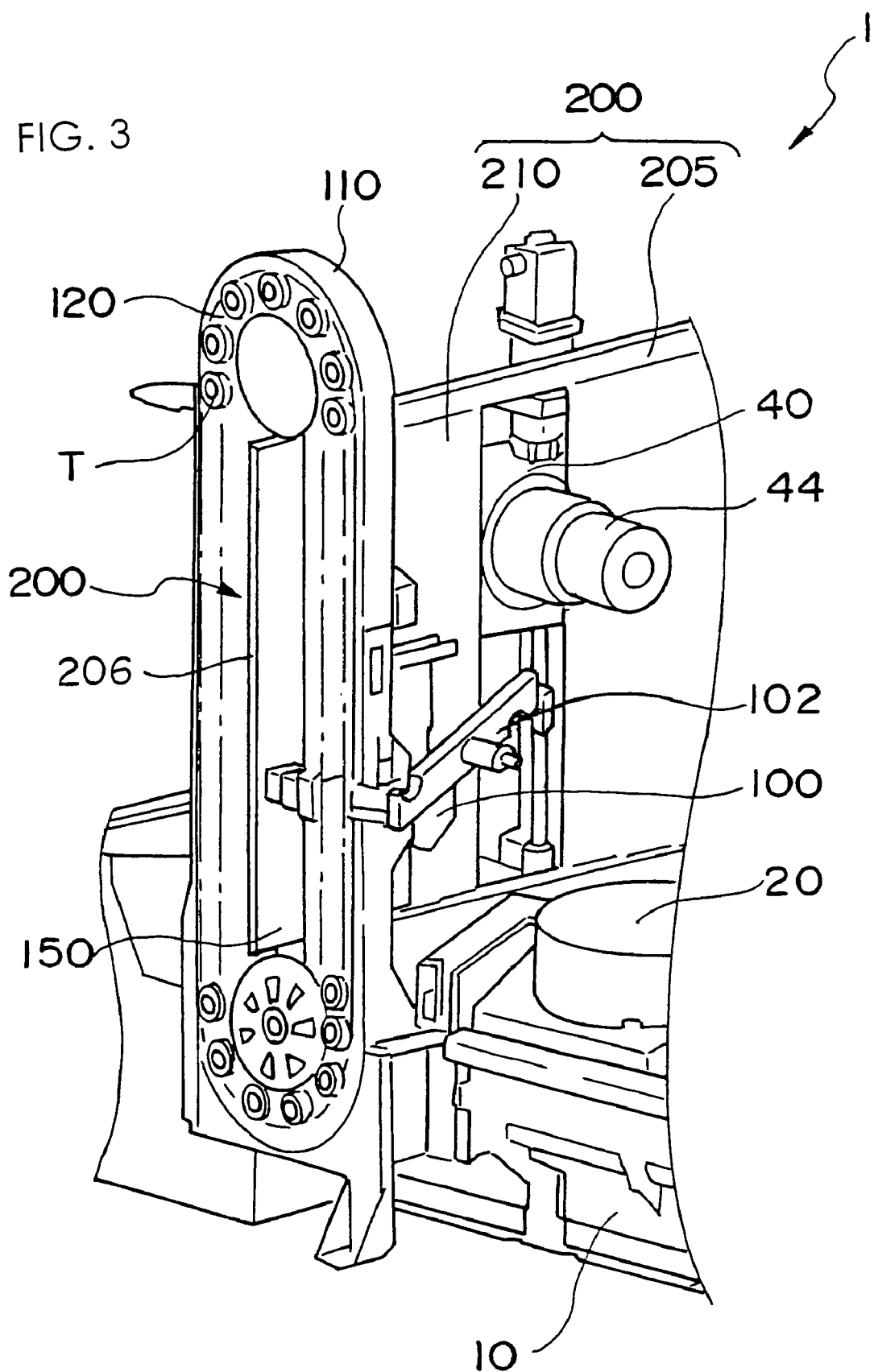
FIG. 3 is a perspective view of the horizontal machining center according to the present invention, viewed from the side of a tool magazine.

FIG. 3 is a perspective view of the horizontal machining center 1 according to the present invention, viewed from the side of the tool magazine 110.

FIG. 3 shows a positional relationship among a tool change arm 102 and the tool magazine 110 of the automatic tool change unit 100 and the spindle 44.

Figure 4:
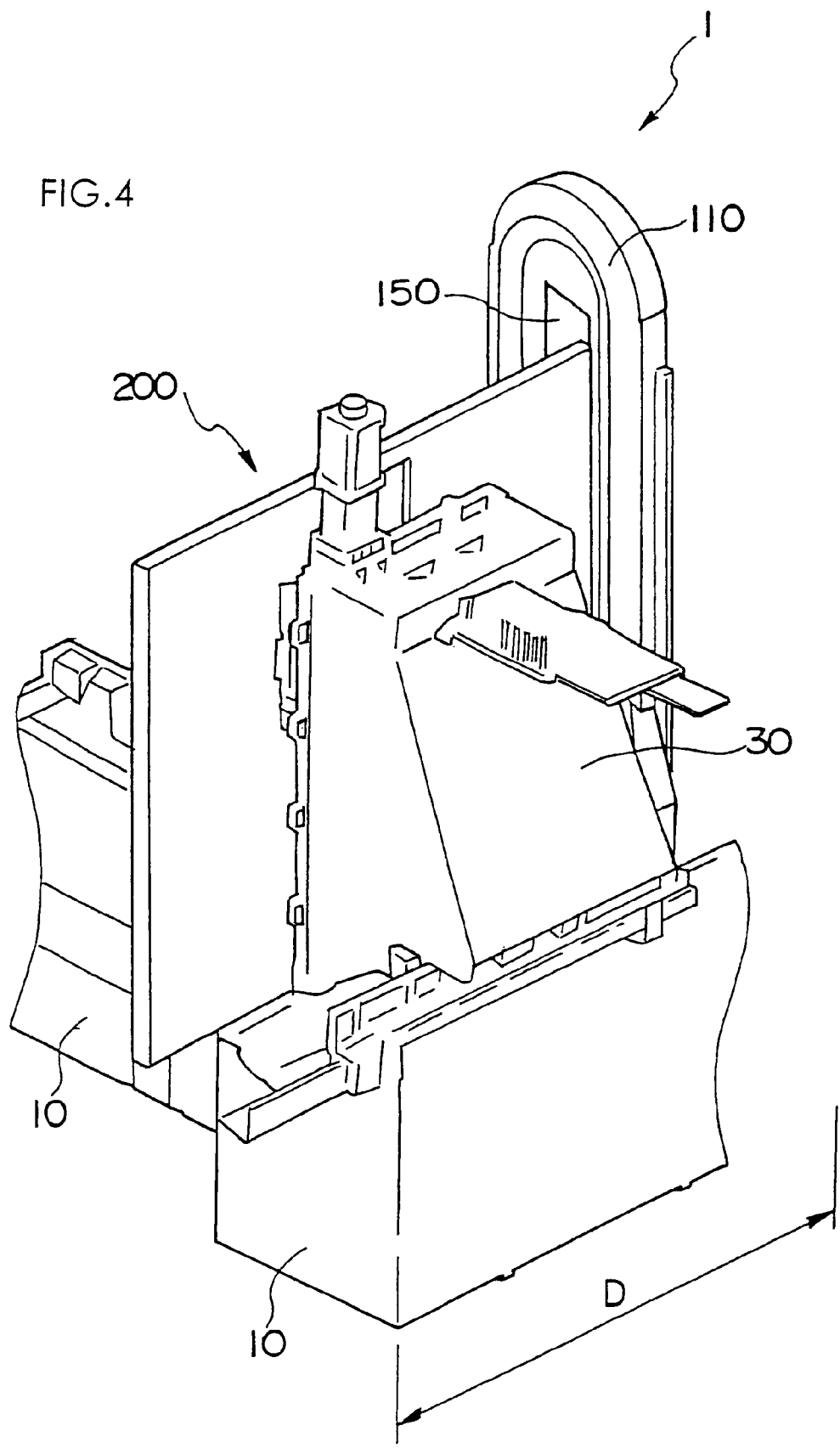
FIG. 4 is a perspective view of the horizontal machining center according to the present invention, viewed from the back thereof.

FIG. 4 is a perspective view of the horizontal machining center 1 according to the present invention, viewed from the back thereof.

FIG. 4 shows the edge of the X-axis slidable surface cover 200 passing through the opening 150 in the tool magazine 110.

In the cover 200 according to the present invention, the paired right and left slidable covers 210 slide along a slide rail received also by the fixed cover 205 and can be removed or mounted at the side edges of the fixed cover.

Figure 5:
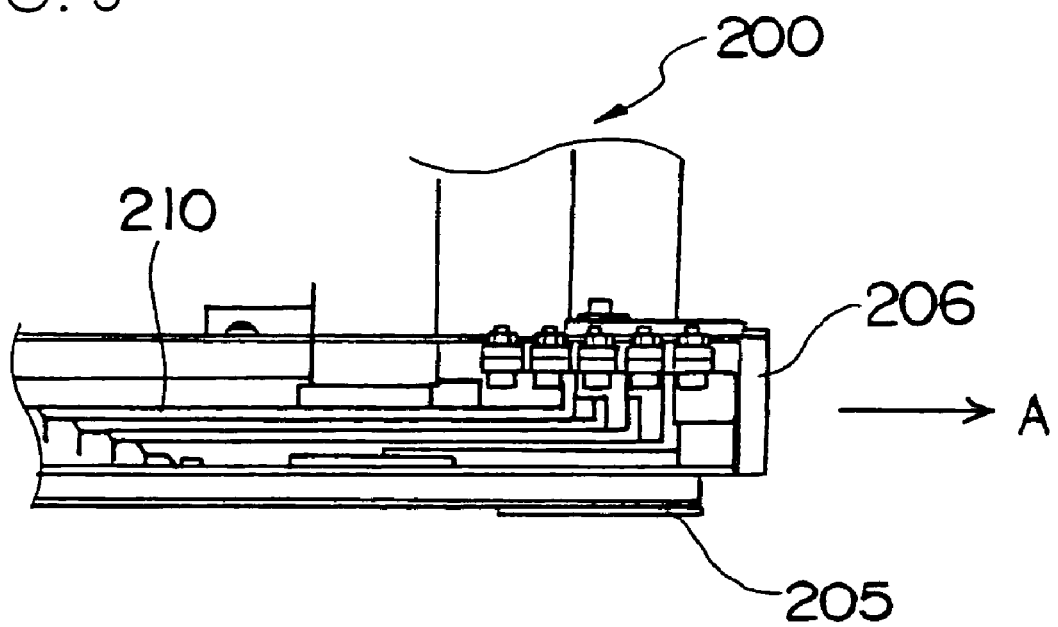
FIG. 5 illustrates an edge part of an X-axis slidable surface cover.

FIG. 5 is a cross sectional view of an edge part of the X-axis slidable surface cover 200.

The X-axis slidable surface cover 200 has a plurality of slidable covers 210 disposed in the fixed cover 205.

The slidable covers 210 slide at a high speed following the high-speed movements of the column 30 along the X axis. The slidable covers repeat such a high-speed movement and stopping and, therefore, require maintenance.

For maintenance, a side wall 206 provided at the end of the X-axis slidable surface cover 200 is removed, and the slidable covers 210 in the fixed cover 205 are drawn sideward in the direction of the arrow A. The edge of the X-axis slidable surface cover 200 on the side of the tool magazine 110 has the same structure.

According to the present invention, since the edge of the X-axis slidable surface cover 200 on the side of the tool magazine 110 protrudes from the opening 150 in the tool magazine 110, the slidable covers 210 can also be readily mounted or removed on the side of the tool magazine 110.

Thus, assembly and maintenance of the X-axis slidable surface cover 200 can be readily accomplished.

Structured as described above, the horizontal machining center 1 according to the present invention can be have a reduced width D. Therefore, the whole machine can be downsized, and the floor space therefore can be saved. In addition, the accessibility of the X-axis slidable surface cover 200 is improved, so that maintenance can be readily performed.

As described above, the present invention can be utilized for downsizing of multitasking machines, such as a horizontal machining center.

What is claimed is:

1. A horizontal machining center, comprising:
   a bed;
   a table mounted on the bed on which a workpiece is mounted;
   a column that moves along a guide rail provided on the bed along a horizontal axis;
   a spindle stock that moves along a guide rail provided on the column along a vertical axis;
   a spindle attached to the spindle stock in a horizontal position;
   an automatic tool change unit disposed close to the spindle; and
   a tool magazine for housing an interchangeable tool,
   wherein a cover disposed between the table and the column comprises a plate-like fixed cover fixed in a vertical plane and a pair of slidable covers supported slidably with respect to the fixed cover, and the cover is disposed with one edge thereof passing through an opening formed in the middle of the tool magazine.

2. The horizontal machining center according to claim 1, wherein the slidable covers are mounted or removed at edges of the fixed cover.

* * * * *